Aug. 8, 1950     D. L. SPENDER     2,517,606
HOSE COUPLING
Filed Nov. 24, 1948
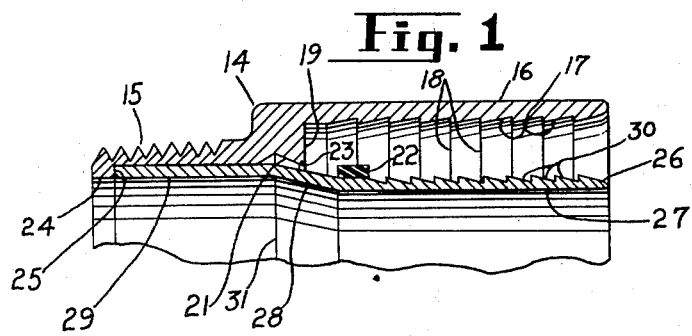
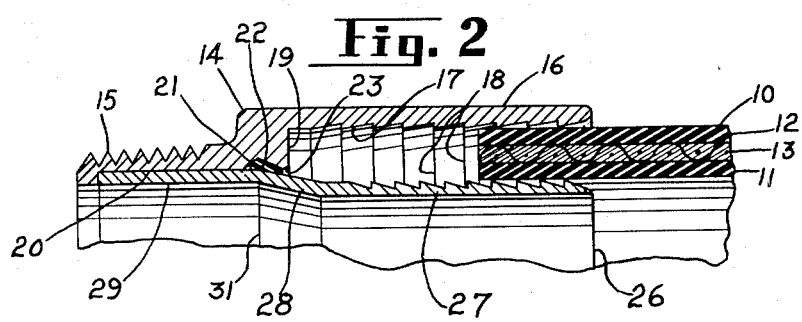
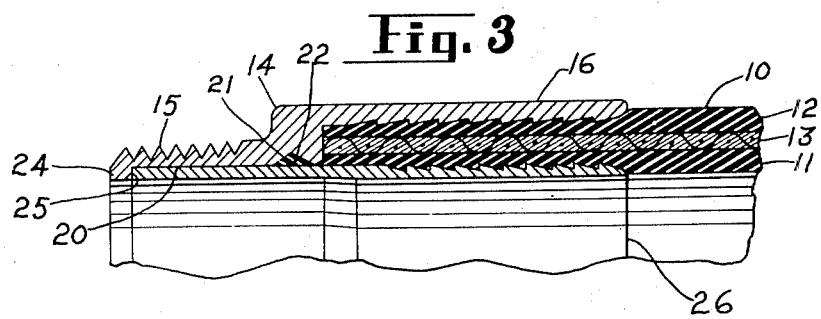
INVENTOR.
Donald L. Spender
BY
H. F. Johnston Patented Aug. 8, 1950

2,517,606

UNITED STATES PATENT OFFICE 2,517,606

HOSE COUPLING

Donald L. Spender, Naugatuck, Conn., assignor to Scovill Manufacturing Company, Waterbury, Conn., a corporation of Connecticut Application November 24, 1948, Serial No. 61,749

3 Claims. (Cl. 285—84)

This invention relates to hose couplings and particularly to a coupling adapted for use with a rubber hose through which gasoline or oil is flowed and having an internal nipple that is expanded outwardly against the hose material in permanently uniting the coupling to the end of a hose length.

One object of this invention is to provide a two-piece coupling with one part having a drive fit into another part, and wherein an effective seal is provided to prevent any leakage of fluid material back through the joined parts of the coupling.

This invention is an improvement upon the Garretson hose coupling construction, such as disclosed in Patent No. 2,262,228, dated November 11, 1941.

Of late, there has been a tendency to make couplings of aluminum material for several reasons:

1st. The material is much lighter than brass or steel also less costly.

2nd. Couplings made of aluminum material can be dyed in various colors so as to harmonize with the hose or equipment to which it may be attached.

3rd. The deforming of the inner nipple made of aluminum in attaching the coupling to the hose can be accomplished measurably easier than other alloy couplings.

Heretofore, in the manufacture of brass or steel couplings of the type represented by the Garretson patent, it was customary to solder the interior nipple into the coupling body for anchorage purposes and assure a leak-proof fit. In making use of aluminum material for such couplings, it was found in practice that aluminum solder could not be depended upon to effect a leak-proof seal, as aluminum solder would, in a short time, oxidize or corrode and permit leakage of gasoline or oil back through the jointed union of the coupling and attack the center reenforcing carcass of the hose.

To overcome these faults, this coupling is designed so that the nippled part is attached to the body part by a drive fit and provision is made for a sealing ring confined in a suitably shaped groove so that the ring is forced into a compressed state coincident with the expansion of the internal nipple to effect a leak-proof joint.

With the foregoing and other objects in view, the invention will be more fully described hereinafter, and will be more particularly pointed out in the appended claims.

In the drawing:

Fig. 1 is a longitudinal quarter section taken centrally through a nipple coupling embodying the features of the present invention as it appears before assembly to the end of a hose and with the sealing washer ready to be assembled into its respective socket.

Fig. 2 is a view similar to Fig. 1 showing the sealing washer in an assembled state and a hose end partially entered into the coupling, and Fig. 3 is a similar view, but with the hose end completely inserted into the coupling and the interior nipple expanded for final assembly.

Referring now to the drawing, this coupling is adapted for use upon various types of hose, and in the present instance is shown as applied to a length of hose 10 such as might be used to conduct gasoline, oil or the like therethrough. Hose of this type is generally made of an inner tube 11 and an outer tube 12 with an interposed carcass 13 composed of a heavy ply of fabric and sometimes having a reenforcing wire wound therethrough.

The coupling unit comprises a body member 14 provided at its outer end, relative to its position on the end of a hose, with an externally threaded shank or spud 15 and provided at its inner end with an enlarged sleeve 16 adapted to engage over the outer end portion of the hose 10, as shown in Fig. 3. The inside wall of the sleeve 16 may be provided with a suitable gripping surface which in the present instance is shown as a series of buttress shaped annular teeth 17 having their abrupt surfaces 18 disposed inwardly relative to the inner end of the sleeve 16, and which teeth 17 are adapted to engage the surface of the outer hose tube 12 and assist in holding the hose 10 from pulling out of the sleeve after the hose has been forced into place therein.

The body member 14 is provided with an interior abutment shoulder 19 against which the end of the hose is adapted to engage. The inner cylindrical wall 20 of the shank 15 adjacent the shoulder 19 is formed with a circumferential V-shaped recess or groove 21 into which is received a sealing washer 22 preferably of a synthetic rubber material capable of withstanding the solvent or injurious influences of gasoline or oil. If desired, the end of the recess 21 adjacent the shoulder 19 may be joined to said shoulder by a slightly flared wall or chamfer 23 to assist in guiding this sealing ring 22 into its recess 21. The opposite end of the shank 15 is formed with an inwardly directed rib 24 providing a stop shoulder 25 at the outer end of the cylindrical wall 20, the wall 20 and shoulder 25 constituting a socket for the reception of a hose insert nipple to be now described.

Positioned within the body member 14 is an expansible hose insert nipple element 26 consisting of a reduced nipple portion 27, an intermediate flared portion 28, and a cylindrical connecting end portion 29, the latter having a drive fit into the cylindrical wall 20 of the shank 15 for permanently securing the hose element 26 to the body member 14. The usual form of "drive fit" tolerance may be provided for in telescoping the connecting end portion 29 into the cylindrical wall 20 with the connecting end portion 29 forced into said cylindrical wall 20 up to the stop shoulder 25. The outer surface of the reduced nipple 27 is provided with buttress shaped teeth 30 similar to the teeth 17 on the inside of sleeve 16 only of a lesser width and serving to grip the inside of the hose inner tube 11.

In effecting a leak-proof seal for this coupling it is to be noted that the sealing washer 22 may initially be of rectangular-shape in cross-section and is of a larger area in cross-section than the cross-sectional area of the V-shaped recess 21 in the body member 14. As shown in Fig. 1 the size of the washer 22 is such as to easily slip over the outside of the reduced nipple 27 up to the flared portion 28 and then be forced up said flared portion and into the recess 22 as shown in Fig. 2. The coupling is so designed that the annular space between the flared portion 28 and the point where recess 21 joins the shoulder 19 is sufficiently large as to allow the sealing washer to readily slip therethrough.

In assembling the coupling to the hose 10, the hose end is first slipped into the annular socket provided between the enlarged sleeve 16 and the reduced nipple portion 27 up to the abutment shoulder 19. In permanently securing the coupling to the hose, a suitable tool is employed having an expanding ball punch that starts from the inner end of the nipple to portion 27 and is drawn through said nipple portion 27 in an outward direction gradually expanding the reduced nipple as it is drawn therethrough, which expansion of the nipple causes the inner and outer tubes of the hose to be embedded in the buttress teeth 17 and 30 of the above sleeve 16 and nipple 27, respectively, such as shown in Fig. 3.

It is to be noted that the point where the flared portion 28 of the hose insert joins with the connecting end 29 at an intersection 31 as noted in Figs. 1 and 2, is shown as positioned intermediate the length of the V-shaped recess 21; but it is to be understood that the intersection 31 could be disposed closer to the inner end of the recess 21, i. e., to the left as viewed in said figures. This allows for more room between the recess 21 and the adjacent surface of the flared portion 28 so that when the reduced nipple 27 is being expanded, the hinging action of the hose insert takes place substantially at this intersection 31 and thus compresses the washer firmly into the recess 21 effecting a liquid-proof seal.

It is obvious that various changes and modifications may be made in the details of construction and design of the above specifically described embodiment of this invention without departing from the spirit thereof, such changes and modifications being restricted only by the scope of the following claims.

I claim:

1. A hose coupling comprising a body having an enlarged sleeve for receiving a hose end and a reduced attaching portion with an abutment shoulder therebetween, a hose insert comprising a reduced nipple, an intermediate flared portion and a connecting end fitted into said attaching portion, means for effecting a seal between said attaching portion and the insert comprising an internal circumferential groove in said attaching portion adjacent the shoulder, and a sealing ring of pliable material disposed in said groove, the cross-sectional area of said ring being normally greater than the cross-sectional area of said groove and adapted to be compressed into and to completely fill the groove to effect a liquid-proof seal at that point coincident with the expansion of said nipple in the assembly of the coupling to a hose.

2. A hose coupling as defined by claim 1 wherein the circumferential groove is of a tapering cross-sectional shape while the sealing ring is generally of rectangular shape in cross section.

3. A hose coupling comprising a body having an enlarged sleeve for receiving a hose end and a reduced attaching portion with an abutment shoulder therebetween, a hose insert comprising a reduced nipple, an intermediate flared portion and a connecting end fitted into said attaching portion, means for effecting a seal between said attaching portion and the insert comprising an internal circumferential groove in said attaching portion adjacent the shoulder, and a sealing ring of pliable material disposed in said groove, the juncture point of the insert flared portion with its connecting end being along the span of said groove whereby in expanding said nipple coincident with the hose assembly said flared portion will be more or less straightened to compress the washer in a compacted state within said groove.

DONALD L. SPENDER.

REFERENCES CITED

The following references are of record in the file of this patent:

UNITED STATES PATENTS

| Number | Name | Date |
|---|---|---|
| 2,262,228 | Garreton | Nov. 11, 1941 |
| 2,268,142 | Lusher et al. | Dec. 30, 1941 |
| 2,374,225 | Melson | Apr. 24, 1945 |
| 2,485,976 | Main | Oct. 25, 1949 |